No. 781,463. PATENTED JAN. 31, 1905.
J. SALLEE.
OPTICAL APPARATUS.
APPLICATION FILED MAY 21, 1904.
3 SHEETS—SHEET 1.
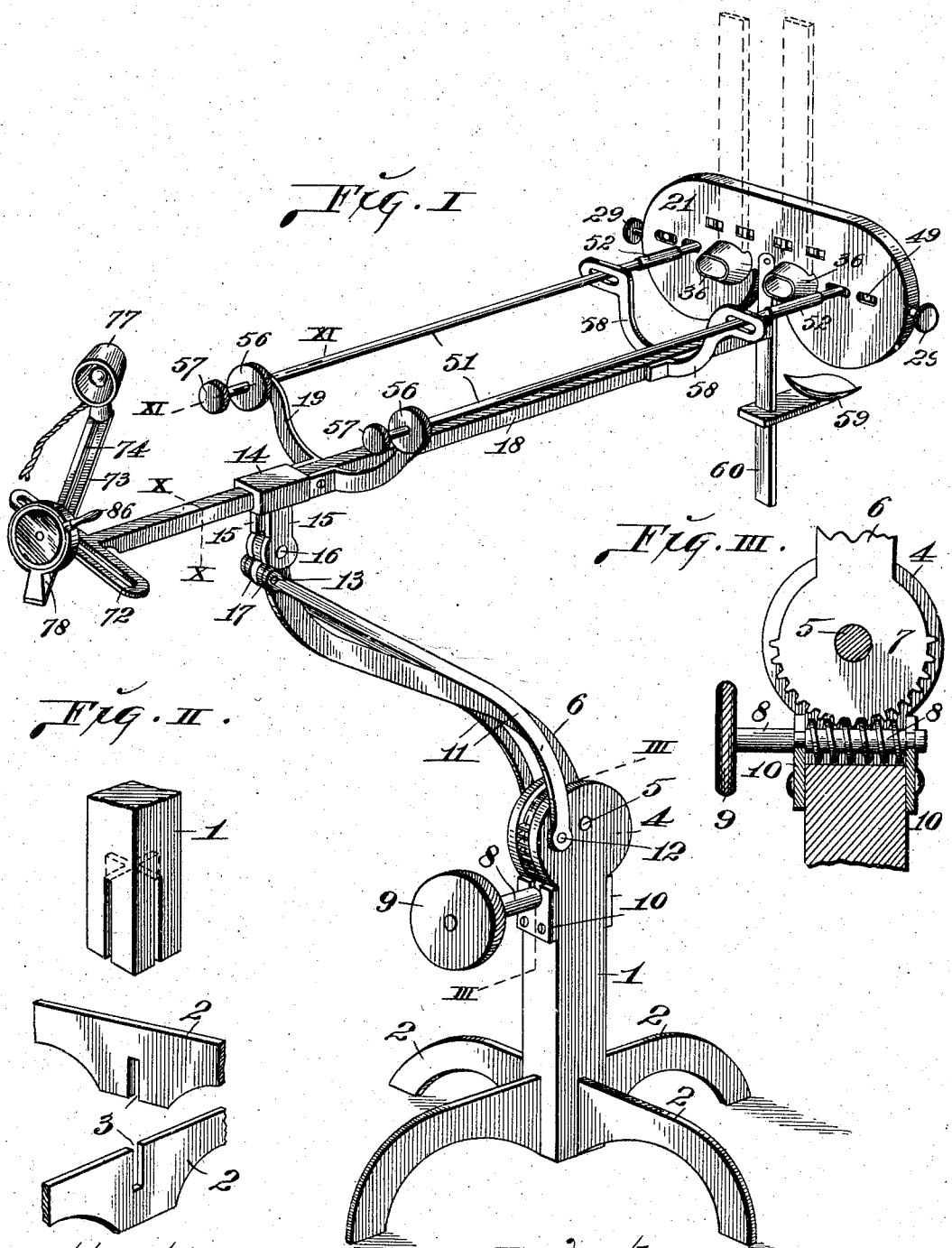

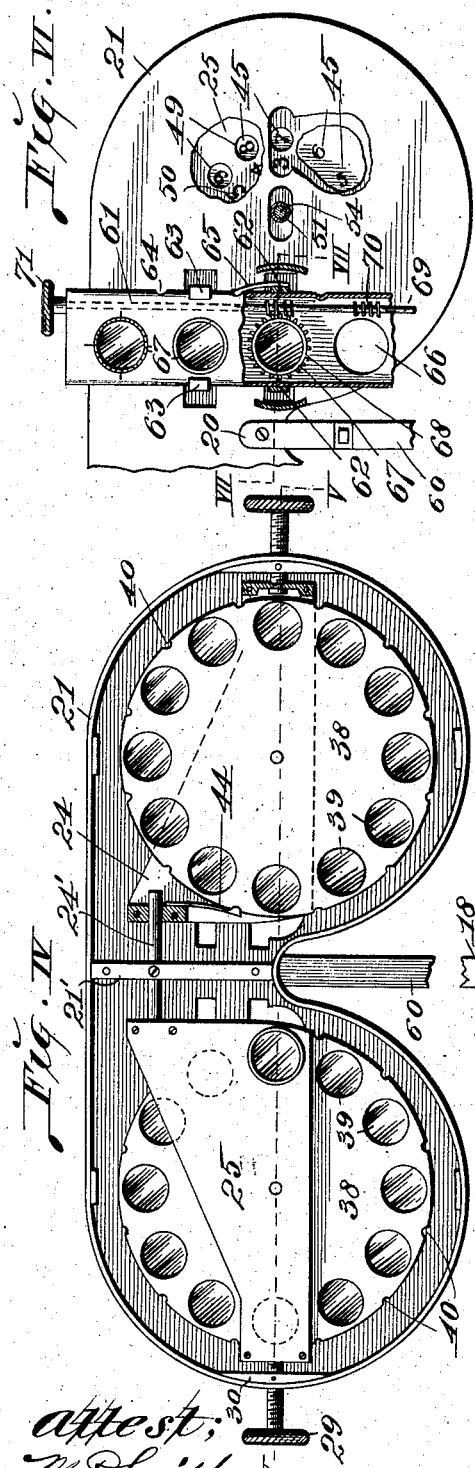
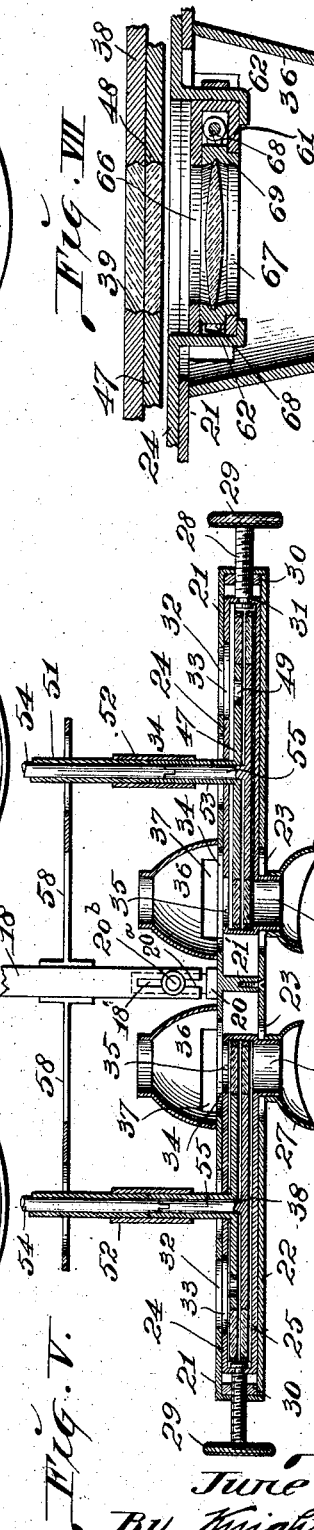
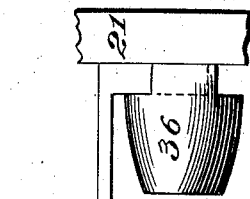
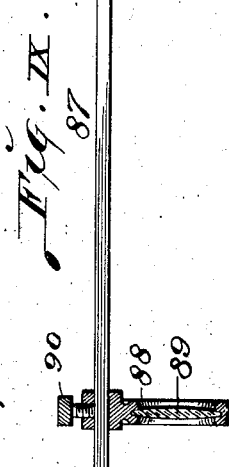
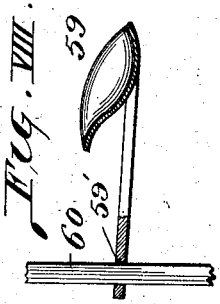

No. 781,463. PATENTED JAN. 31, 1905.
J. SALLEE.
OPTICAL APPARATUS.
APPLICATION FILED MAY 21, 1904.
3 SHEETS—SHEET 3.
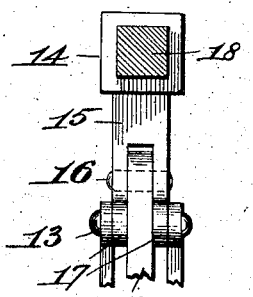
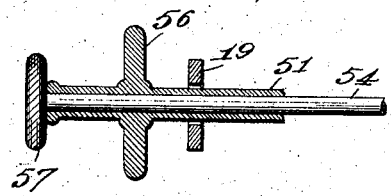
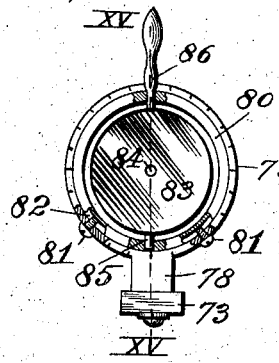
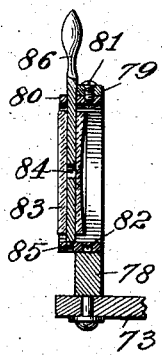
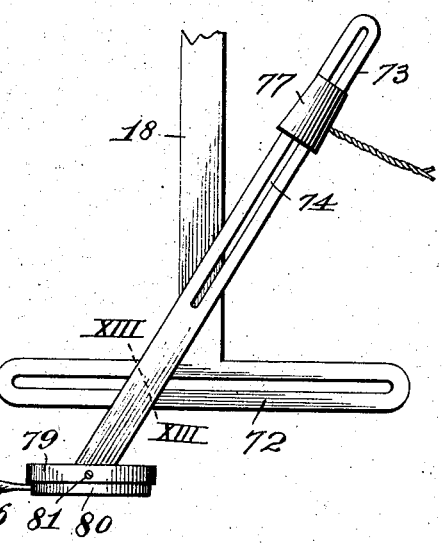
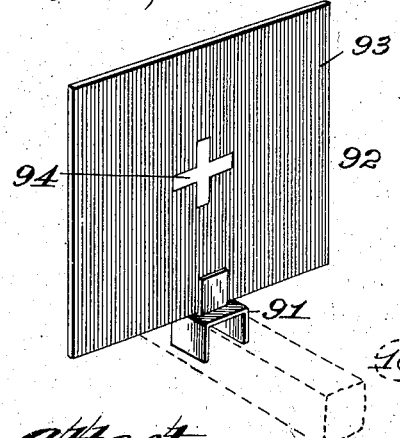
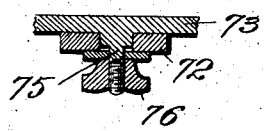
Attest:
M. Smith
Blanche Hogan
Inventor:
June Sallee
By Knight & Bro
Attys No. 781,463.

Patented January 31, 1905.

UNITED STATES PATENT OFFICE.

JUNE SALLEE, OF LITCHFIELD, ILLINOIS.

OPTICAL APPARATUS.

SPECIFICATION forming part of Letters Patent No. 781,463, dated January 31, 1905.

Application filed May 21, 1904. Serial No. 209,095.

*To all whom it may concern:*

Be it known that I, JUNE SALLEE, a citizen of the United States, residing in the city of Litchfield, in the county of Montgomery and State of Illinois, have invented certain new and useful Improvements in Optical Apparatus, of which the following is a full, clear, and exact description, reference being had to the accompanying drawings, forming part of this specification.

My invention relates to an optical apparatus for use by oculists in discerning defects in the eyes of patients and testing the eyes for the purpose of discovering the proper lenses to be used in overcoming defects in patients' eyes.

The instrument has combined therein the essential characteristic features of a retinoscope, ophthalmoscope, phorometer, and lens-trial sets.

Figure I is a perspective view of my apparatus. Fig. II is a perspective view of fragments of the stand of the apparatus. Fig. III is an enlarged vertical section taken on line III III, Fig. I. Fig. IV is an elevation of the trial-lens box and the trial-lens wheels therein, the face-plate of the box being removed. Fig. V is a horizontal longitudinal section taken on line V V, Fig. IV. Fig. VI is a rear elevation of a portion of the trial-lens box with parts broken out and in vertical section. Fig. VII is an enlarged horizontal section taken on line VII VII, Fig. VI. Fig. VIII is a section of the chin-rest of the apparatus. Fig. IX is a view of the ophthalmoscopical magnifying-lens members of the apparatus. Fig. X is an enlarged view, partly in vertical cross-section, taken on line X X, Fig. I, and showing in elevation parts of the apparatus adjacent to said line. Fig. XI is an enlarged longitudinal section taken on line XI XI, Fig. I. Fig. XII is an enlarged top or plan view of the mirror and lamp of the apparatus and the parts by which these members are carried. Fig. XIII is an enlarged cross-section taken on line XIII XIII, Fig. XII. Fig. XIV is an elevation of the mirror of the apparatus. Fig. XV is a vertical section taken on line XV XV, Fig. XIV. Fig. XVI is a perspective view of the phorometer test-card used in connection with my apparatus.

The stand of my apparatus consists of a standard 1, that is slotted at its lower end in two bisecting lines, as seen in Fig. II, to receive base leg members 2, that cross each other and which are provided with slots 3, so that they interlock with each other. At the upper end of the standard 1 is a bifurcated head 4, in which is a pivot-pin 5.

6 is a swinging support that is mounted in the head 4 on the pivot 5 and which bears at its lower end a toothed segment 7. This toothed segment receives the engagement of a worm-screw 8, having a knob 9 and mounted in bearings 10. (See Figs. I and III.) Through the medium of this worm-screw the swinging support may be oscillated vertically to vary the elevation of the members of the apparatus carried thereby to suit the elevation of the eyes of the patient which are being examined.

11 represents rockers having their lower ends pivoted at 12 to the standard-head 4.

14 is a box that is provided with depending legs 15, that are connected to the upper end of the swinging support 6 by a pivot-pin 16. These legs bear ears 17, that are united to the rockers 11 by pivot-pins 13, so that when oscillation is imparted to said swinging support a contrary movement will be imparted to the box 14 and its legs through the medium of the rockers 11 to maintain said box constantly in a horizontal plane.

18 designates a horizontal bar that is slidably positioned in the box 14. This bar has fixed to it a pair of laterally-extending arms 19, the utility of which will hereinafter appear.

20 designates an upright that is carried by a stem 20$^a$, projecting rearwardly from and seated in the forward end of the horizontal bar 18, in which it is adjustably held by a set-screw 20$^b$ or other suitable means, the horizontal bar being slotted at 18' (see Fig. V) to receive said set-screw. By this connection of the upright to the horizontal bar I provide for forward and rearward adjustment of the upright and the parts carried thereby, to be presently described.

21 is a lens-box supported by the upright 20. The box 21 is flanged at its edge and is provided with a removable face-plate 22, in the central portion of which are elongated openings 23. (See Fig. V.)

24 represents reciprocating frames that are located in the box 21 and each of which includes a front plate 25, removably secured to the rear portion of the frame, so that it may be disconnected therefrom. The carrier-frame front plates are provided with necks 26, that protrude through the box-face-plate openings 23, as seen in Fig. V.

27 represents eyepieces that encircle the patient's eyes during the use of the apparatus, these eyepieces being fitted to the necks 26, as seen in Fig. V, so that any movement of the reciprocating frames 24 will result in like movement of the eyepieces to space them apart distances corresponding to varying degrees of separation of eyes in different patients.

Reciprocation is imparted to the frames 24 through the medium of adjustment-screws 28, that are provided with knobs 29 and having screw-threaded engagement in plates 30, secured to the lens-box 21. The inner ends of the adjustment-screws are circumferentially grooved at 31 to engage the reciprocating frames, so that when the adjustment-screws are rotated reciprocation will be imparted to said frames either inwardly or outwardly, as desired, to secure the proper reciprocation of the eyepieces 27. The reciprocating frames are slidably supported at their inner ends upon a guide-rod 24', that is mounted in a supporting-rib 21', projecting from the rear wall of the lens-box, as seen in Fig. IV. The lens-box 21 is provided with a pair of sight-openings 32, located at the rear side of the box, and in the reciprocating frames are sight-openings 33, that register with the sight-openings 32. The purpose of providing these sight-openings will hereinafter appear. In the lens-box and reciprocating frames in line with the eyepieces and the necks of the reciprocating frames are also in the respective parts sight-openings 34 and 35.

36 represents shade-tubes secured to the rear side of the lens-box and inclosing the sight-openings 34, the said tubes being provided with vertical slots 37.

38 represents forward lens-disks each provided with a plurality of lens-pockets 39 and having at the periphery a series of notches 40, that receive detents 44 (see Fig. IV) by which said lens-disks are held from rotation when turned to bring one of the lens-pockets with the lens therein in line with the sightways through the reciprocating frame-necks, the sight-openings 35 and 34, respectively, in the reciprocating-frames and lens-box, and the sightways through the shade-tubes 36. Upon the rear face of the lens-disks 38 are numerals corresponding to the description of the particular lenses in the pockets 39 of said disks, as indicated at 45, Fig. VI.

47 designates rear lens-disks that are provided with lens-pockets 48 to receive lenses and arranged for registration with the pockets in the forward lens-disk. These rear lens-disks are held in fixed positions by a detent similar to that 44, so that when a lens-pocket in the rear disk is brought into registration with a lens-pocket in the forward disk it will be retained in such position. In the rear lens-disk are sight-openings 49, (see Figs. I, V, and VI,) through which the lens-designating figures on the rear side of the forward lens-disks may be observed, and on the rear faces of the rear lens-disks are figures indicating the character of the lenses opposite their location, as seen at 50, Fig. VI.

Rotation is imparted to the rear lens-disks 47 through the medium of tubular turn-rods 51, the forward ends of which are seated in sleeves 52 and engage stems 53, carried by said disks. The forward disks 38 are rotated through the medium of turn-rods 54, that are loosely positioned in the tubular turn-rods 51 and which engage stems 55, carried by said disks, as seen in Fig. V. Upon the rear ends of the turn-rods 51 are knobs 56 and upon the rear ends of the turn-rods 54 are knobs 57. The turn-rods 51 are loosely supported in the arms 19, as seen in Fig. I. The rods are also mounted in brace-arms 58, secured to a horizontal bar 18.

59 designates a chin-rest movably mounted on a leg 60, forming a part of the upright 20 and adapted to serve as a support for the chin of the patient whose eyes are being examined in the use of my apparatus. The arm of the chin-rest 59 is vertically adjustable on the leg 60, so that said chin-rest may be raised and lowered to suit various patients, the adjustment of said arm being secured by forming an opening in the arm to receive the leg 60 and inclining the walls of said opening downwardly and rearwardly at the front of the leg to produce an angle-point 59', that engages the front side of the leg, as seen in Fig. VIII. It will be seen that when the chin-rest is held horizontally its arms will slide on the leg 60 either upwardly or downwardly, and when the chin-rest proper is in a stationary position or downward pressure is exerted thereupon the angle-point 59' will be firmly pressed against the leg 60 to effect the support of the rest.

61 designates slides reciprocally positioned in clip-arms 62 and 63, that are carried by the reciprocating frames 24 and extend through the rear wall of the lens-box 21, so that said slides 61 may be shifted vertically within said clip-arms. At one edge of each of the slides 61 are notches 64, that receive the engagement of detents 65, each carried by one of the clip-arms 62, by which the slides are supported. In the slides are sight-openings 66. (See Figs. VI and VII.)

67 represents lens-rings that are seated at intervals in the slides 61 opposite the sight-openings 66 and which are provided at their perimeters with teeth 68.

69 represent operating-rods extending longitudinally and vertically through the slides 61 and bearing at intervals worms 70, that engage the teeth of the lens-rings 67 to rotate the rings, the said shafts being provided with knobs 71, by which they may be turned.

The rings 67 may contain either trial cylindrical lenses or prism lenses of varying degrees of power and character, so that various tests may be made with them when used in connection with the lenses in the lens-disks 38 and 47.

72 designates a slotted head extending transversely of the horizontal bar 18 at its rear end. This head serves as a support for the mirror and lamp of the apparatus, which comprises a bar 73, provided with a longitudinal slot 74 and seated upon said head, to which it is secured by a screw-thread stem 75, that passes through the slot in the head and bears a thumb-nut 76. (See Fig. XIII.) This arrangement provides for the adjustment of the bar 73 relative to the head 72 and the horizontal bar 18, by which said head is carried.

77 is a lamp mounted on the bar 73 and adapted to be shifted longitudinally thereof by moving the connection securing the lamp to the rear in a longitudinal slot 74.

78 is a mirror-frame, that is mounted upon the bar 73 at the opposite end from that to which the lamp is fitted. This frame includes a ring 79, within which is a ring 80, that is rockingly held to the outer ring by set-screws 81, that extend into grooves 82 in the inner ring to retain it.

83 is a mirror provided with a central sight-opening 84 and swiveled for rocking movement in the inner ring 80 through the medium of a stud 85 and a handle 86.

87 designates one of a pair of lens-supporting bars that at their forward ends are seated in the slots of the shading-tubes 36. (See Fig. IX.) These bars serve as supports for adjustable magnifying-lens frames 88, that contain lenses 89 and are held to said bars by set-screws 90 when adjusted to the proper position for observation through said lenses and the other lenses of the apparatus hereinbefore referred to.

91 designates a clip adapted to be seated on the horizontal bar 18 in the line of vision through the lenses of the apparatus. 92 is a phorometer test-card that is seated in said clip, as seen in Fig. XVI. This test-card is provided with a main ground 93 of one color and bears a central cross 94 of a color distinguished from said main ground. This test-card is utilized in connection with a colored trial-lens in the apparatus in combination with prism-lenses to discover defects in the vision of the eye of the patient and the proper remedy therefor. The clip 91 may also be used as a holder for an ordinary near-test-reading chart.

In the practical use of my apparatus the horizontal bar 18 and the parts carried thereby are elevated to the proper height to suit the patient by turning the worm-shaft 8 to oscillate the swinging support 6 and rockers 11, by which the horizontal bar 18 is carried. The reciprocating frames 24 are then moved outwardly or inwardly by rotating the adjustment-screws 28 to properly position the eye-pieces 27 and the lenses in the disks 38 and 47 to suit the distance of separation of the patient's eyes. The lamp and mirror carrying members are then properly adjusted by the oculist to afford reflection of light from the mirror through the lenses of the apparatus in the usual manner, and the lens-disks are rotated to carry the various lenses therein into positions in front of the patient's eyes according to the tests being made, the rotation of the lens-disks being affected by manipulation of the turn-rods 51 and 54, connected thereto. When the lenses in the slides 61 are brought into use, these slides are adjusted vertically in the clip-arms 62 and 63, and the lenses in the rings 67 are rotated with the rings to secure the desired results by manipulation of the operating-shafts 69, that engage said wheels through the medium of the worms 70. The apparatus may be utilized in addition to the manner in which reference has heretofore been made for distance reading by placing a chart at a suitable location in the line of vision through the lenses of the apparatus, according to the usual practice.

I claim as my invention—

1. In an optical apparatus, the combination of a lens-box, a pair of reciprocating frames in said box, means for reciprocating said frames independently of each other, and lens-disks supported by said frames, substantially as set forth.

2. In an optical apparatus, the combination of a lens-box, a pair of reciprocating frames in said box, means for reciprocating said frames independently of each other, lens-disks carried by said frames, and eyepieces carried by said frames, substantially as set forth.

3. In an optical apparatus, the combination of a lens-box, a pair of reciprocating frames in said box, means for reciprocating said frames independently of each other, pairs of rotatable lens-disks in said box supported by said frames, and means for rotating said lens-disks independently of each other, substantially as set forth.

4. In an optical apparatus, the combination of a lens-box, a pair of reciprocating frames in said box, guides on which said frames operate, an adjustment-screw seated in each end of each of said boxes and having individual connection with said frames, and rotatable lens-disks carried by said frames, substantially as set forth.

5. In an optical apparatus, the combination of a lens-box, lens-carrying means mounted in said box, a shading-tube supported by said box, a supporting-bar fitted to said shading-tube, and a magnifying-lens carrier adjustably mounted on said supporting-bar, substantially as set forth.

6. In an optical apparatus, the combination of a horizontal bar, a lens-box supported by said bar, lens-carriers in said box, a slotted head at the rear end of said bar, a slotted bar mounted on said head and adjustable longitudinally thereof, a mirror-frame mounted on said slotted bar, a mirror in said frame, and a lamp adjustably mounted on said slotted bar, substantially as set forth.

7. In an optical apparatus, the combination of a stand, a swinging support mounted in said stand, means for rocking said support, rockers pivoted to said stand, a horizontal bar, lens members supported by said bar, and means of connection between said swinging support and rockers and said bar, substantially as set forth.

8. In an optical apparatus, the combination of a stand, a swinging support pivotally mounted in said stand, and provided with a rack, a worm-shaft journaled in said stand and engaging said rack, a pair of rockers pivoted to said stand, a member to which the upper ends of said swinging support and rockers are independently pivoted, a horizontal bar mounted in said member, and lens-carrying means supported by said horizontal bar, substantially as set forth.

9. In an optical apparatus, the combination of a chin-rest-supporting leg, a chin-rest having an arm provided with an aperture to receive said leg, said aperture having an inclined wall furnishing an angle-point adapted to engage said leg for the adjustable support of the chin-rest, substantially as set forth.

10. In an optical apparatus, the combination of a horizontal supporting-bar, a lens-box, and means whereby said lens-box is adjustably connected to said supporting-bar, substantially as set forth.

In testimony whereof I have hereunto set my hand, at the city of St. Louis, Missouri, on this 2d day of May, 1904.

JUNE SALLEE.

In presence of—
E. S. KNIGHT,
NELLIE V. ALEXANDER.